United States Patent [19]

Tveitane

[11] Patent Number: 4,792,192
[45] Date of Patent: Dec. 20, 1988

[54] AUTOMATIC BRAKE SOURCE SELECT SYSTEM

[75] Inventor: Nils Tveitane, Bothell, Wash.

[73] Assignee: The Boeing Company, Seattle, Wash.

[21] Appl. No.: 155,162

[22] Filed: Feb. 11, 1988

[51] Int. Cl.$^4$ ............................................. B60T 15/16
[52] U.S. Cl. ........................................ 303/13; 188/16;
  188/152; 188/151 A; 188/354; 244/111;
  303/6.01; 303/9.61; 303/14; 303/84.1; 303/63;
  303/113; 303/DIG. 3
[58] Field of Search .................. 244/111; 188/106 P,
  188/106 R, 152, 16, 354, 151 A, 105, 355–360;
  303/10–12, 13–15, 9.61, 6.01, 16–17, 84.2, 84.1,
  63, 100, 113–119, 91, 92, DIGS. 1–4

[56] References Cited

U.S. PATENT DOCUMENTS

| | | | |
|---|---|---|---|
| 2,323,927 | 7/1943 | Mercier | 91/33 |
| 2,491,812 | 12/1949 | Hoffacker, Jr. | 188/358 |
| 2,680,500 | 6/1954 | Jenkins | 188/153 R |
| 2,692,662 | 10/1954 | Clifton | 188/355 |
| 2,759,690 | 8/1956 | Dewar | 244/111 |
| 2,945,727 | 7/1960 | La Dona | 303/63 |
| 3,672,729 | 6/1972 | Blakey | 303/9 |
| 3,817,584 | 6/1974 | Huston et al. | 303/9.74 |
| 3,901,556 | 8/1975 | Prillinger et al. | 303/6.01 X |
| 3,999,075 | 12/1976 | Johnson et al. | 303/14 X |
| 4,008,868 | 2/1977 | Berg | 244/111 |
| 4,063,624 | 12/1977 | Beck et al. | 192/4 A |
| 4,071,284 | 1/1978 | Masclet et al. | 303/63 |
| 4,166,654 | 9/1979 | Snodgrass | 303/14 |
| 4,425,006 | 1/1984 | Bertrand et al. | 303/3 |
| 4,478,318 | 10/1984 | Hayden | 303/84.2 X |
| 4,493,509 | 1/1985 | Kilner et al. | 303/13 |
| 4,586,584 | 5/1986 | Auman et al. | 303/13 X |

*Primary Examiner*—Douglas C. Butler
*Attorney, Agent, or Firm*—Christensen, O'Connor, Johnson & Kindness

[57] ABSTRACT

A brake source select system for selecting one of a plurality of sources of pressurized hydraulic fluid for use in actuating a brake system. The brake source select system (10) includes a primary, secondary and reserve source (20, 22 and 24) of pressurized hydraulic fluid connected in fluid communication respectively to a primary selector valve (32), a secondary selector valve (96) and a reserve selector valve (102). Pressurized hydraulic fluid from the primary source (20) is applied to deselect ports (94 and 100) on the secondary and reserve selector valves, causing those valves to block fluid flow from their associated sources to the brake system, so long as the primary source is operative. Upon failure of the primary source, pressurized fluid is no longer applied to the deselect port of the secondary selector valve, thereby enabling fluid flow through the valve, and causing pressurized hydraulic fluid from the secondary source to be applied to the deselect port (160) of the reserve selector valve and to a deselect port (164) of the primary selector valve, effectively blocking fluid flow through each of those valves. Should the secondary source fail, elimination of the pressurized fluid applied to the deselect port of the reserve selector valve enables it to conduct pressurized hydraulic fluid to the brake system, and applies the pressurized hydraulic fluid to the primary and secondary selector valve deselect ports, blocking fluid flow through those valves. Thus, failure of a higher priority source automatically results in selection of a next lower priority source to provide pressurized fluid to the brake system. In addition, a source of pressurized fluid associated with retraction of a landing gear is applied to a selection port (208) of the secondary selector valve, causing that valve to provide a source of pressurized hydraulic fluid to actuate the brakes, slowing the rotation of wheels prior to full retraction of the landing gear.

30 Claims, 3 Drawing Sheets

AUTOMATIC BRAKE SOURCE SELECT SYSTEM

FIELD OF INVENTION

This invention generally relates to a brake system, and more specifically, to a system for selecting a source of pressurized brake fluid from a plurality of such sources.

BACKGROUND OF THE INVENTION

One of the more important systems on any vehicle is its braking system. Clearly, failure of the braking system on a vehicle creates a high probability of an accident causing substantiel property damage and injury. Accordingly, modern automobiles are typically provided with redundant braking systems to ensure that at least partial braking capacity remains should the primary system fail.

A reliable brake system is even more critical on an aircraft, particularly large commercial jet aircraft carrying hundreds of passengers and landing at speeds of several hundred miles per hour. Failure of the brake system on an aircraft may cause the plane to overshoot the end of the runway, or to collide with other taxiing aircraft or ground structures, resulting in damage and possible loss of life. Thus, it is important that the braking systems installed on aircraft be designed to greatly reduce the likelihood of even a partial brake failure. Unlike either the manual or power assisted brakes of an automobile, large aircraft brakes are actuated by pressurized fluid provided by a hydraulic pump in response to brake pedal force. The brake pedal controls a metering valve to modulate the pressure applied to the brakes. A fully redundant braking system on an aircraft includes both multiple sources of pressurized fluid and multiple metering valves to ensure that full braking capacity is always available.

A large commercial jetliner such as the Boeing 747 includes a primary, a secondary, and a reserve source of pressurized hydraulic fluid for actuating the brakes. The brake system for each landing gear includes both "normal" and reserve metering valves and normal and reserve anti-skid valves. The flight crew monitors the hydraulic fluid pressure in the brake system and manually switches to the secondary source system if the primary system pressure drops below a predetermined level. Should the quantity of hydraulic fluid in the primary or secondary brake system fall below a critical level, the crew may switch to the reserve source of pressurized brake fluid and to the reserve metering and anti-skid valves, since it is presumed that there is a leak either in the primary/secondary source supply lines or in the normal metering and anti-skid valves. Thus, one of the flight crew members must be responsible for monitoring the status of the brake systems at critical times. When three crew members are available this is not a problem. However, it has been proposed that only a two-man flight crew be provided. Since both crew members must devote their attention to other systems on the aircraft prior to and during landing, no one will be available to continually monitor the condition of the brake system. The current, manual braking source select system will thus be unacceptable for use on a larger aircraft having only the proposed two-man flight crew.

Any automatic brake source selection system must be extremely reliable, and capable of functioning even if there is a loss of electrical power, or failure of any single component in the system. An unattended brake source select system should also automatically brake the wheels upon retraction of the landing gear. Should the primary source of brake pressure fail, the brake source select system should automatically revert to a source having the next lower priority, but should alert the crew of the aircraft that the primary system has failed by lighting a warning light on an annunciator display panel. Furthermore, to minimize costs, the automatic source select system should require minimal alteration of the braking system of an aircraft on which it is retrofitted. The present invention meets these requirements better than a number of alternative approaches that were considered, and its advantages will be apparent from the attached drawings and the description of the preferred embodiments that follow.

SUMMARY OF THE INVENTION

In accordance with the present invention, a brake source select system is provided for selecting one of a plurality of separate sources to provide pressurized fluid to a brake system. If one or more sources having a higher priority fails, a source next in preferential priority is selected. The brake source select system includes a plurality of differential pressure-actuated valves. Each valve has at least one inlet port, at least one outlet port, at least one select port and at least one deselect port. Application of pressurized fluid to the select port of one of the valves causes an internal movable shuttle within the valve to provide fluid communication between the inlet and the outlet ports, and if applied to the deselect port, causes the movable shuttle to block fluid communication between the inlet and outlet ports. One of the valves is associated with each source of the pressurized fluid.

A plurality of source lines are provided, each connecting one of the sources of pressurized fluid in fluid communication with the inlet port of the valve associated with that source. Similarly, one of a plurality of supply lines connects the outlet port of one of the valves in fluid communication with the brake system. Each of the sources is further connected in fluid communication with one of the select ports of the valve associated with that source. Also provided are a plurality of deactivation lines, each connecting one of the sources having a higher priority in fluid communication with one of the deselect ports of the valves associated with sources having a lower priority.

Pressurized fluid flowing from operating higher priority sources and supplied through the deactivation lines, causes the movable shuttle within each valve associated with a lower priority source to block fluid flow between its inlet and outlet ports. However, loss of fluid pressure due to failure of one or more sources of higher priority results in selection of the source of next lower priority that has not failed, thereby enabling the lower priority source to supply pressurized fluid to the brake system.

All of the valves except the valve associated with the source having the highest priority include bias means for biasing the valves to block fluid communication between their inlet and outlet ports. In addition, the internal movable shuttle within each valve includes at least one passage able to provide fluid communication between the inlet and outlet ports. The bias means preferably comprise a spring tending to move the shuttle to a position in which fluid communication between the inlet and outlet ports is blocked.

A checkvalve is disposed in the source line connected to the source having the highest priority, and is oriented so that it permits fluid flow through the source line from said source, but blocks fluid flow in the opposite direction. An accumulator chamber, at least partially filled with a compressible gas, has a bidirectional port connected in fluid communication with the source line that is connected to the source having the highest priority, at a point between the checkvalve and the inlet port of said valve. The gas in the accumulator chamber is compressed as pressurized fluid from said source enters the accumulator chamber. Should all other sources of pressurized fluid fail, the accumulator chamber is operative to supply pressurized fluid to the brake system for a limited time.

The brake source select system further includes a return line associated with each valve, providing a fluid communication path for fluid to return to that source once it is selected. At least one of the valves includes a return inlet port and a return outlet port that are connected in fluid communication whenever the inlet and outlet ports of the valve are connected in fluid communication.

When installed on an aircraft having a landing gear on which is disposed at least one wheel slowed by the brake system, the brake source select system may further comprise a gear-up line supplied with pressurized fluid during retraction of the landing gear. The gear-up line is connected to a select port on one of the valves, so that upon retraction of the landing gear, pressurized fluid is supplied to that select port, causing the inlet port of the valve to be connected in fluid communication with the outlet port. Retraction of the landing gear thus causes pressurized fluid from said one of the sources to be applied to the brake system, stopping rotation of the wheel on the landing gear prior to its complete retraction.

DESCRIPTION OF THE PREFERRED EMBODIMENT

Figure 1:
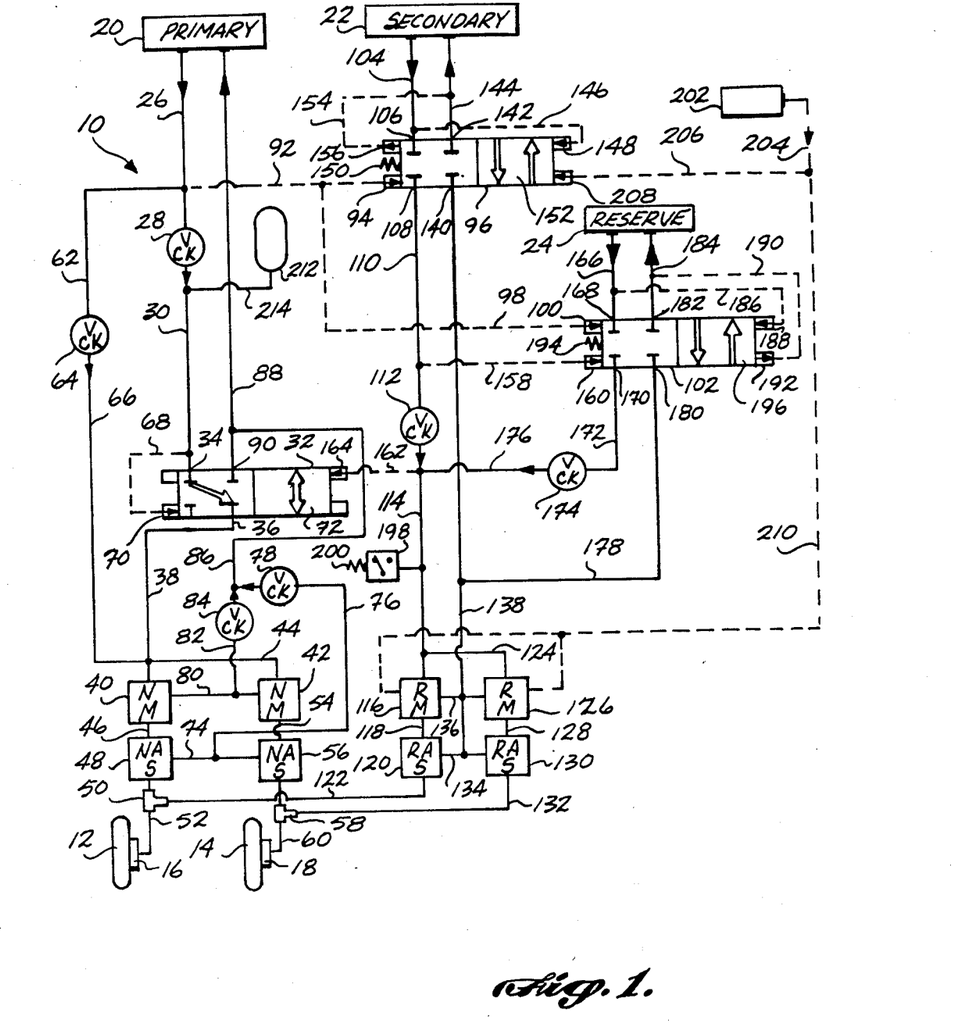
FIG. 1 is a schematic diagram showing the brake source selector system.

FIG. 1 schematically illustrates in a block diagram the configuration of a preferred embodiment of the brake source selector system, generally denoted by reference numeral 10. Brake source select system 10 is used to automatically select one of a plurality of sources of pressurized hydraulic fluid for use in actuating the brakes associated with the wheels of an aircraft on which the source selector system is installed. In the referenced figure, only two wheels 12 and 14 are shown, exemplary of the plurality of wheels on the landing gear of a large aircraft. Wheels 12 and 14 respectively include carbon brakes 16 and 18 of generally conventional design. Three separate hydraulic pumps (not shown) provide multiple redundant sources of pressurized hydraulic fluid for actuating carbon brakes 16 and 18 when the aircraft is landing, and while taxiing on the ground. Pressurized hydraulic fluid is applied to the brakes from one of the three sources according to a predetermined priority. The primary source 20 is normally selected as the source of pressurized fluid; however, should it fail, brake source selector system 10 automatically selects a secondary source 22, and if that source also fails, a reserve source 24.

Pressurized hydraulic fluid from primary source 20 flows through a line 26 to a checkvalve 28, which is oriented to block fluid flow in the opposite direction, but to permit fluid flow from primary source 20 into a line 30, downstream of checkvalve 28. Line 30 is connected to a primary selector valve 32, at an inlet port 34. The hydraulic fluid flows through primary selector valve 32 and out an outlet port 36 into lines 38 and 44, which are in fluid communication with "normal" metering valves 40 and 42, respectively. Whenever the pilot or other member of the flight crew depresses the brake pedal in the cockpit (not shown) normal metering valves 40 and 42 respond by modulating the pressure of hydraulic fluid in lines 46 and 54, and thus the pressure applied to "normal" anti-skid valves 48 and 56, respectively. The modulated pressure of the hydraulic fluid applied to brakes 16 and 18 is also controlled by normal anti-skid valves 48 and 56. The anti-skid valves help to avoid wheel lockup and improve directional stability of the aircraft while braking on slippery surfaces. Hydraulic fluid at the modulated pressure developed by the normal metering and anti-skid valves is applied through a "T" connector 50 from normal anti-skid valve 48, to a line 52, which is in fluid communication with carbon brake 16. Similarly, brake fluid from normal anti-skid valve 56 is applied through a "T" connector 58 to a line 60, which is connected in fluid communication with carbon brakes 18.

Should primary selector valve 32 fail, an alternative path for pressurized hydraulic fluid from primary source 20 is provided through a line 62, which is connected in fluid communication with line 26. The pressurized hydraulic fluid from primary source 20 thus flows through lines 26 and 62, and through a checkvalve 64, oriented to permit fluid flow from primary source 20 into an attached line 66, disposed downstream from checkvalve 64. Fluid flow is blocked from line 66 back toward line 62 by checkvalve 64. The other end of line 66 is connected in fluid communication with lines 38 and 44, providing an alternate path for pressurized hydraulic fluid from the primary source to flow to normal metering valves 40 and 42.

Primary source 20 is operative to supply pressurized hydraulic fluid via line 30 to a control line 68 connected in fluid communication thereto. The other end of control line 68 is connected to a select port 70 disposed on the primary selector valve. (While shown as an external line, control line 68 preferably comprises an internal passage within the primary selector valve.) Application of pressurized fluid to the select port enables fluid communication between inlet port 34 and outlet port 36 by moving an internal movable shuttle 72 to a position permitting such fluid flow.

As is the case with most hydraulic systems, a return path must be provided for the hydraulic brake fluid to flow back to a reservoir from which the fluid is withdrawn by the source hydraulic fluid pump. Accordingly, a return line 74 connects normal anti-skid valves 48 and 56 in fluid communication with a return line 76. Returning hydraulic fluid within return line 76 flows through a checkvalve 78 connected thereto, which is oriented to permit fluid flow from return line 76 into an attached return line 86 and to block fluid flow in the opposite direction. In addition, a return line 80 connects normal metering valves 40 and 42 in fluid communication with a return line 82, which is similarly connected to a checkvalve 84. Returning hydraulic fluid flows through checkvalves 78 and 84 into return line 86, and is blocked by the checkvalves from flowing in the reverse direction. Return line 86 is connected in fluid communication with a return line 88, conveying the returning hydraulic fluid back to the primary source 20. In addition, the other end of return line 88 is connected to a return outlet port 90 on primary selector valve 32.

Pressurized hydraulic fluid from line 26 is supplied through a control line 92 to a deselect port 94 on a secondary selector valve 96. Application of the pressurized hydraulic fluid to deselect port 94 causes the secondary selector valve to block fluid flow to and from the secondary source 22. Furthermore, a control line 98, in fluid communication with control line 92, is operative to provide pressurized hydraulic fluid from the primary source 20 to a deselect port 100 on a reserve selector valve 102, causing that valve to block fluid flow to and from the reserve source 24.

In the event that the primary source 20 fails, there is a loss of fluid pressure in lines 26 and 62, and consequently in control lines 92 and 98. Loss of the fluid pressure applied to deselect port 94 of the secondary selector valve 96 permits the secondary selector valve to enable pressurized hydraulic fluid to flow from the secondary source 22 for use in actuating carbon brakes 16 and 18.

Assuming that it is operative, pressurized hydraulic fluid from the secondary source 22 is conveyed by a line 104 to an inlet port 106 on the secondary selector valve 96. When failure of the primary source causes loss of pressure on deselect port 94, the pressurized hydraulic fluid from secondary source 22 flows through secondary selector valve 96 and out an outlet port 108, into an attached line 110. Line 110 conveys the pressurized hydraulic fluid to a checkvalve 112, which is oriented to permit fluid flow into an attached line 114, but to block fluid flow in the opposite direction. The pressurized hydraulic fluid from the secondary source is thus supplied to reserve metering valves 116 and 126, which are controlled by the cockpit brake pedal in parallel with normal metering valves 40 and 42. Reserve metering valve 116 is connected in fluid communication with a reserve anti-skid valve 120 by a line 118. A line 124 conveys the pressurized fluid from line 114 to reserve metering valve 126, and the pressure modulated hydraulic fluid from that reserve metering valve is applied by a line 128 to a reserve anti-skid valve 130. Hydraulic fluid from reserve anti-skid valves 120 and 130 is conveyed through lines 122 and 132, respectively, to "T" connectors 50 and 58, for application to carbon brakes 16 and 18.

A return line 134 connects reserve anti-skid valves 120 and 130 in fluid communication with a return line 138. Similarly, a return line 136 connects reserve metering valves 116 and 126 to return line 138. Return line 138 conveys the returning hydraulic fluid to a return inlet port 140 on secondary selector valve 96. The returning fluid flows through the secondary selector valve and out through a return outlet port 142 into a return line 144, through which it is conveyed back to the secondary source.

Hydraulic fluid from the secondary source 22 flowing through line 104 is also conveyed through a control line 146 (an internal passage within the selector valve in the preferred embodiment) to a select port 148 on the secondary selector valve. Secondary selector valve 96 responds to a differential force resulting from the pressure of hydraulic fluid applied to its deselect port 94 from the primary source 20 and to its select port 148 from the secondary source 22. In addition, a spring 150 provides a biasing force tending to assist the force caused by hydraulic fluid applied to deselect port 94. Loss of fluid pressure due to failure of the primary source 20 permits the pressure in control line 146 from the secondary source to move an internal shuttle 132 from a position in which fluid flow through the secondary selector valve is blocked into the position in which fluid flow is permitted between inlet port 106 and outlet port 108, and between return inlet port 140 and return outlet port 142. A drain line 154 is connected to a drain port 156 on the secondary selector valve to enable hydraulic fluid that would otherwise be trapped within the selector valve to flow into return line 144. Details of the selector valve design are discussed in greater detail hereinbelow.

Pressurized hydraulic fluid from line 110 is also supplied through a control line 158 connected in fluid communication with a deselect port 160 on reserve selector valve 102. Application of the pressurized fluid to deselect port 160 causes selector valve 102 to block fluid flow from the reserve source 24 to the reserve metering valves 116 and 126. The pressurized fluid from the secondary source in line 114 is also supplied to a deselect port 164 in the first selector valve 32 through a control line 162. Application of pressurized fluid to deselect port 164 causes movable insert 72 to block fluid flow between inlet port 34 and outlet port 36, and instead connect outlet port 36 in fluid communication with return outlet port 90. The path thus provided by internal movable shuttle 72 relieves any residual pressure on the normal metering valves 40 and 42, ensuring that reserve metering valves 116 and 126 and reserve anti-skid valves 120 and 130 are operative to solely control application of pressurized hydraulic fluid to carbon brakes 16 and 18.

Pressurized fluid from reserve source 24 is supplied through a line 166 to an inlet port 168 on reserve selector valve 102. In the event that both the primary and secondary sources of fluid pressure have failed, the loss of fluid pressure applied to deselect ports 100 and 160 from those sources enables the reserve selector valve to convey pressurized hydraulic fluid from reserve source 24 through the reserve selector valve and out an outlet port 170, into an attached line 172. The other end of line 172 is connected to a checkvalve 174, which is oriented to permit fluid flow from the reserve selector valve into a line 176, but to block fluid flow in the opposite direction. Line 176 provides fluid communication between the checkvalve and line 114. Pressurized fluid from the reserve source passing through line 176 is also conveyed through control line 162 into deselect port 164, causing internal movable shuttle 72 in the primary selector valve to block fluid flow between the inlet and outlet ports 34 and 36 as previously described. In addition, the pressurized hydraulic fluid in line 114 is conveyed to reserve metering valves 116 and 126 through both lines 114 and 124. Reserve metering valves 116 and 126 and reserve anti-skid valves 120 and 132 are thus operative to control the pressure of the hydraulic fluid from the reserve source 24 applied to carbon brakes 16 and 18, as previously described. Hydraulic fluid returning from reserve metering valves 116 and 126 and reserve anti-skid valves 120 and 130 through return line 138 flows through a connected return line 178 to a return inlet port 180 on reserve selector valve 102. The returning hydraulic fluid flows through the reserve selector valve, exiting at return outlet port 182, and flows through a return line 184 connected thereto, back to the reserve source.

Loss of pressure in line 104 due to failure of the secondary source 22 eliminates fluid pressure applied to select port 148 on secondary selector valve 96. Loss of fluid pressure on select port 148 enables spring 150 to force internal movable shuttle 152 to a position blocking fluid flow between inlet port 106 and outlet port 108, and between return inlet port 140 and return outlet port 142.

Reserve selector valve 102 is also responsive to a plurality of differential forces, which determine whether pressurized hydraulic fluid from reserve source 124 may flow through the valve to activate carbon brakes 16 and 18. If either the primary or secondary sources 20 and 22 are operational, pressurized hydraulic fluid from those sources is supplied to deselect ports 100 or 160, respectively. In addition, pressurized hydraulic fluid from line 166 is supplied through a control line 186 to a select port 188 on the reserve selector valve 102. A spring 194 is operative to provide a force tending to assist the force of hydraulic fluid supplied through either of deselect ports 100 or 160, forcing an internal movable shuttle 196 to block fluid flow through the reserve selector valve as long as fluid pressure exists on either of the deselector ports 100 or 160. Failure of both the primary and secondary sources 20 and 22 eliminates fluid pressure at deselector ports 100 and 160, enabling the fluid pressure applied to selector port 188 to overcome the force of spring 194, and causing the internal movable shuttle 196 to move to a position conveying hydraulic fluid between inlet port 168 and outlet port 170, and between return inlet port 180 and return outlet port 182. A drain port 192 is provided on reserve selector valve 102 for conveying hydraulic fluid from the selector valve into an attached drain line 190, which is in fluid communication with return line 184. Drain port 192 thus enables hydraulic fluid that would otherwise be trapped within reserve selector valve 102, blocking movement of internal movable shuttle 196, to be returned to the reserve source 24.

A pressure-actuated switch 198 is connected in fluid communication with line 114. A spring 200 associated with the pressure-actuated switch ensures that the switch is normally open unless fluid pressure within line 114 causes the switch to close. However, pressure-actuated switch 198 is only subjected to fluid pressure from line 114 if the primary source 20 has failed and pressurized hydraulic fluid is being supplied from either the secondary or reserve sources 22 or 24. The electrical contacts (not shown) within pressure-actuated switch 198 are connected to an indicator light disposed on an annunciator display panel (not shown) within the cockpit, and when closed apply electrical power to the light, thereby warning the flight crew that the primary source of hydraulic pressure has failed. The warning light ensures that the flight crew is aware of the primary source failure and will refer the aircraft for maintenance upon landing, or will abort the flight before takeoff, should the failure be noted in time.

Wheels 12 and 14 are typically mounted upon retractable landing gear (not shown), which are deployed while the aircraft is approaching the field for landing and while the aircraft is on the ground. Following takeoff, the flight crew causes the landing gear to retract within the fuselage or wing structure of the aircraft. Due to the relatively limited space of the wheel well in which the landing gear is stored, wheels 12 and 14 are likely to come into contact with portions of the aircraft wheel well when the landing gear is fully retracted, making it essential that the wheels have stopped rotating prior to the occurrence of such contact. Accordingly, a source of fluid pressure used to retract the landing gear is provided to the brake source select system, identified as the "gear-up source," reference numeral 202. Pressurized hydraulic fluid provided from gear-up source 202 is conveyed through a control line 204 both to a control line 206 connected to a select port 208 on secondary selector valve 96, and to a control line 210 connected to modulate pressurized hydraulic fluid through reserve metering valves 116 and 126. The pressurized hydraulic fluid within control line 206 causes the internal movable shuttle 152 within secondary selector valve 96 to move to a position enabling hydraulic fluid to flow to and from secondary source 22, and making that pressurized fluid available to activate carbon brakes 16 and 18. The hydraulic fluid provided through control line 210 drives reserve metering valves 116 and 126 to modulate the pressure of hydraulic fluid from the secondary source, causing rotation of wheels 12 and 18 to stop prior to full retraction of the landing gear on which the wheels are mounted.

An accumulator chamber 212 is connected in fluid communication with line 30 by means of a line 214. During normal operation of primary source 20, pressurized hydraulic fluid flows from the primary source through line 214 into the accumulator chamber, compressing air (or other gas) that is trapped in its upper portion. In the event that the primary, secondary and reserve sources of pressurized hydraulic fluid all fail, compressed air trapped within the accumulator vessel 212 provides pressurized hydraulic fluid to the normal metering valves 40 and 42 for a limited time. The pressurized hydraulic fluid within line 30 is applied through control line 68 to select port 70 on the first selector valve ensuring that a fluid path is provided through the selector valve from the accumulator chamber 212. Checkvalves 28 and 64 prevent the pressurized hydraulic fluid from the accumulator chamber flowing back toward the primary source 20. Likewise, checkvalves 112 and 174 isolate each of the sources from other higher priority sources in the event that the higher priority source has failed. In this respect, it should be apparent that the highest priority source is primary source 20, followed by the secondary source 22, and finally by the reserve source 24.

Figure 2:
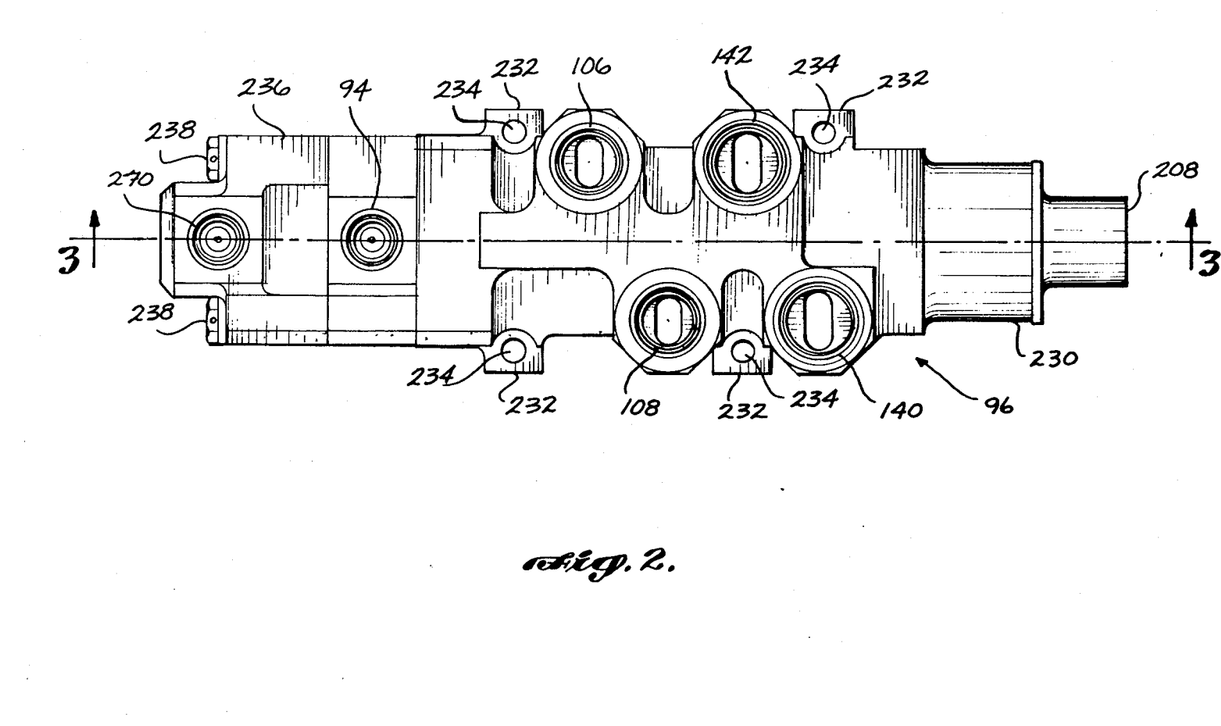
FIG. 2 is a plan view of one of the selector valves used in the brake source selector system.
Figure 3:
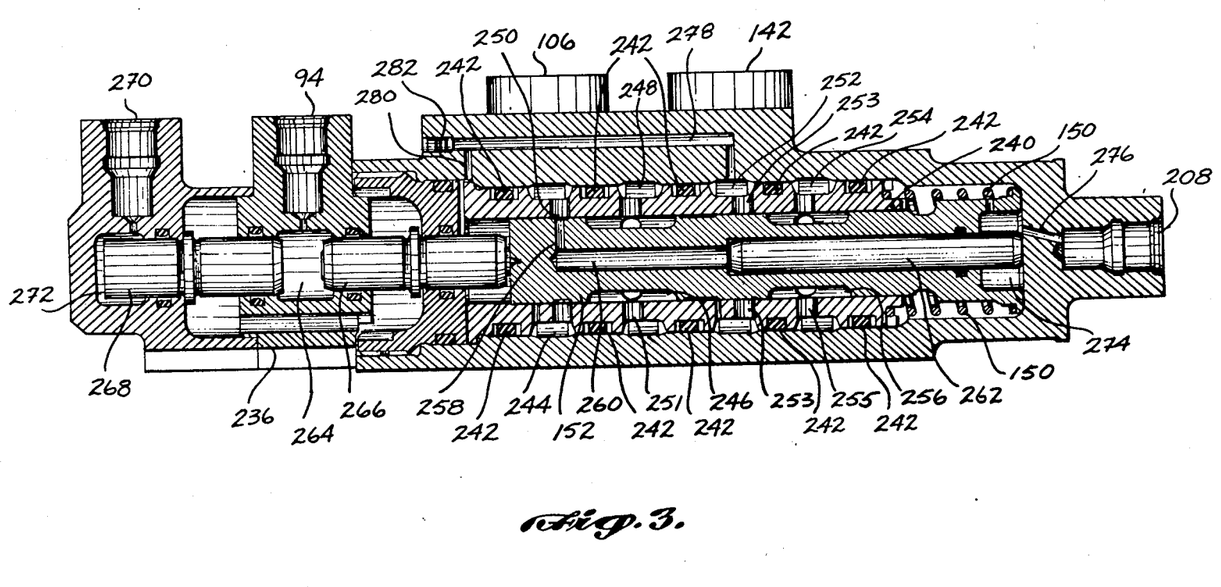
FIG. 3 is a cross-sectional view of selector valve, taken along section line 3—3 of FIG. 2.

Turning now to FIGS. 2 and 3, a top plan view and cross-sectional view of the secondary selector valve 96 is shown, which is generally exemplary of the construction of the primary selector valve 32 and reserve selector valve 102. Inlet port 106, outlet port 108, return inlet port 140 and return outlet port 142 are disposed on a central portion of a valve body 230, threaded to accept a suitable tubing connector. Likewise, select port 208 and deselect ports 94 and 270 are threaded to accept a suitable fitting appropriate for attachment of the control lines (or plug). Main valve body 230 includes a plurality of mounting tabs 232 that extend outwardly, and which include mounting holes suitable for installing the selector valve using bolts or other fasteners (not shown). Deselect ports 94 and 270 are disposed in a control port body 236 attached to one end of the main valve body 230 using bolts 238.

Details of the internal construction of secondary selector valve 96 are most easily understood by reference to the cross-sectional view shown in FIG. 3. Valve body 230 is formed to include an annular bore in which is fitted the generally cylindrically shaped movable insert shuttle 152. Movable insert shuttle 152 is able to move along the longitudinal axis of valve body 230 from left to right, as shown in FIG. 3. A seal carrier insert 240 is fixedly mounted within valve body 230, generally concentric about the movable insert shuttle, and is operative to define a plurality of annular fluid passages 244, 248, 252 and 254, separated by a plurality of "O" rings 242, disposed around its perimeter and at spaced apart intervals along the longitudinal axis of the seal carrier insert.

Movable insert shuttle 152 includes a first annular channel 246 and a second annular channel 256 formed concentrically around its perimeter and spaced apart along its longitudinal axis. The annular fluid passage 244 formed in seal carrier insert 240 is aligned with the center of inlet port 106, adjacent to one end of a plurality of radial bores 250, which extend radially through the seal carrier insert. The annular fluid passage 248 formed within the seal carrier insert is aligned with the center of the outlet port 108 and in fluid communication through a plurality of radial passages 251, with annular channel 246. Similarly, annular fluid passage 252 is formed within seal carrier insert 240, in alignment with the center of return outlet port 142, and annular fluid passage 254 is formed within seal carrier insert 240 in alignment with the center of return passage inlet port 140, each respectively disposed adjacent radial passages 253 and 255. However, as shown in FIG. 3, fluid communication between radial passages 250 and 251 via first annular channel 246, and between radial passages 253 and 255 via second annular channel 256 is blocked, thereby preventing fluid flow between the inlet and outlet ports and between the return inlet port and return outlet port. In order to enable fluid flow between these respective pairs of ports, movable insert 152 must move to the left relative to its position shown in the drawing figure, so that first annular channel 246 connects radial passages 250 and 251, and so that second annular channel 256 connects radial passages 253 and 255.

Spring 150 (generally helical in shape) is disposed within valve body 230 between seal carrier insert 240 and the end of movable insert shuttle 152. The spring thus provides a biasing force tending to force the movable insert shuttle 152 into the position shown in FIG. 3, blocking fluid flow between the inlet and outlet ports and between the return inlet and outlet ports, as described above. Moreover, application of pressurized hydraulic fluid to deselect port 94 fills a deselect chamber 260 formed within control port body 236 with the fluid. The pressurized hydraulic fluid within the deselect chamber acts upon the end of a floating piston 266, forcing the piston toward the right relative to the view shown in FIG. 3, so that the opposite end of floating piston 266 contacts the end of internal movable shuttle 152, thereby providing a force tending to assist spring 150 in moving the internal movable shuttle into the position blocking fluid flow through the selector valve. The same result occurs if pressurized hydraulic fluid is applied to deselect port 270, filling a deselect chamber 272. The pressurized fluid in the deselect chamber acts upon a floating piston 268, forcing it to move toward the right from the position shown in FIG. 3, until its end contacts floating piston 266. Floating piston 266 transmits the force from floating piston 268 to internal movable shuttle 152, causing it to block fluid flow through the selector valve. Thus it will be apparent that application of pressurized hydraulic fluid to either of deselector ports 94 or 270 causes fluid flow through the selector valve to be blocked.

In the event that pressurized hydraulic fluid is not applied to either of deselector ports 94 or 270, but is applied to the inlet port 106, internal movable shuttle 152 is caused to move from the position shown in FIG. 3 toward the left, enabling fluid flow through the selector valve between inlet ports 106 and outlet port 108, and between return inlet port 140 and return outlet port 142 in the manner previously described. Pressurized hydraulic fluid applied to inlet port 106 is conveyed through a radial passage 258 from radial passage 250 into a central control chamber 260. The pressurized fluid exerts a force on one end of a cylindrical, longitudinally extending plug 262, causing the internal movable shuttle 152 to move toward the left. It will be apparent that the area of the end of plug 262 is relatively smaller than the area of the end of floating pistons 266 and 268. Accordingly, the force produced by hydraulic fluid applied to inlet port 106 is much less than the force developed by hydraulic fluid of equal pressure applied to deselect ports 94 or 270. The presence of pressurized hydraulic fluid within central control chamber 260 is thus only able to move the internal movable shuttle 152 to a position enabling fluid flow through the valve, in opposition to the bias force of spring 150, when pressurized hydraulic fluid is not applied to either deselect ports 94 or 270.

Pressurized hydraulic fluid applied to select port 208 is conveyed through a passage 276 into a select chamber 274 where it acts upon the end of internal movable shuttle 152, forcing the shuttle toward the left, thereby enabling fluid flow through the selector valve. The sum of the forces provided by fluid pressure applied to selector port 208 and by fluid pressure present at input port 106 exceeds the sum of the bias force provided by spring 150 and the force developed by pressurized hydraulic fluid applied to deselect port 94 or 270, assuming the pressure of the hydraulic fluid applied to each port is approximately equal.

A fluid drain passage 278 connects radial passage 280 to the return output port 142, ensuring that hydraulic fluid is not trapped within the valve, blocking motion of internal movable shuttle 152. Other passages (not shown) provide fluid paths for hydraulic fluid from chambers within the valve body 230 and control port body 236 to flow back to the return output port, enabling the hydraulic fluid to be returned to the source.

Further details of selector valve 96 and modifications required to provide the primary selector valve 32 or the reserve selector valve 102 are not disclosed, since it should be apparent to a person of ordinary skill in the art how the disclosed design of the secondary selector valve may be modified to carry out the functions disclosed for each of the other selector valves. For example, since the primary selector valve 32 does not require a spring comparable to spring 150, the spring is simply not included when the primary selector valve is assembled. Furthermore, it will be apparent that other types of selector valves may be used in brake source select system 10 to achieve comparable results. However, any selector valve used for this purpose must provide the same failsafe function as disclosed for selector valve 96 (and also applicable to selector valves 32 and 102), namely, the failure of any selector valve must not result in the loss of more than one source of hydraulic pressure to actuate the brakes.

While the present invention has been disclosed with respect to a preferred embodiment, modifications thereto will be apparent to those of ordinary skill in the art within the scope of the claims that follow. Accordingly, it is not intended that the scope of the invention be in any way limited by the disclosure, but instead should be determined solely by reference to the claims.

The embodiments of the invention in which an exclusive property or privilege is claimed are defined as follows:

1. A brake source select system, for selecting one of a plurality of separate sources to provide pressurized fluid to a brake system according to a preferred priority, so that if one or more sources having a higher priority fails, a source that is next in preferential priority is selected, comprising:
    (a) a plurality of differential fluid pressure actuated valves, each valve having at least one inlet port, at least one outlet port, at least one select port through which a pressurized fluid may be applied to cause the valve to provide fluid communication between the inlet port and the outlet port and at least one deselect port through which a pressurized fluid may be applied to cause the valve to block fluid communication between the inlet port and the outlet port, one valve being associated with each of the sources of pressurized fluid;
    (b) a plurality of source lines, each connecting one of the sources of pressurized fluid in fluid communication with the inlet port of the valve associated with that source;
    (c) a plurality of supply lines, each connecting the outlet port of one of the valves in fluid communication with the brake system;
    (d) a plurality of activation lines, each connecting one of the sources in fluid communication with one of said select ports of the valve associated with said one source; and
    (e) a plurality of deactivation lines, each connecting one of the sources having a higher priority in fluid communication with one of said deselect ports of the valves associated with sources having a lower priority, pressurized fluid provided by said higher priority sources causing each of the valves associated with the sources of lower priority to block fluid flow between their inlet port and outlet port, loss of fluid pressure due to failure of one or more sources of higher priority resulting in the source of next lower priority that has not failed being selected to provide pressurized fluid to the brake system.

2. The brake source select system of claim 1, wherein all of the valves except the valve associated with the source having the highest priority include bias means for biasing the valves to block fluid communication between the inlet port and outlet port.

3. The brake source select system of claim 2, wherein the valves each include an internal moving shuttle in which is disposed at least one passage able to provide fluid communication between the inlet and the outlet ports, the bias means comprising a spring tending to move the shuttle to a position in which fluid communication between the inlet and the outlet ports is blocked.

4. The brake source select system of claim 1, further comprising a checkvalve disposed in the source line connected to the source having the highest priority and oriented so that it allows fluid flow through the source line from said source, but blocks fluid flow in a direction toward said source, and an accumulator chamber at least partially filled with a compressible gas and having a port connected in fluid communication with the source line that is connected to the source having the highest priority, at a point between the checkvalve and the inlet port of said valve, the gas in the accumulator being compressed by the pressurized fluid from said source, said accumulator chamber being operative to supply pressurized fluid to the brake system for a limited time after all the sources of pressurized fluid have failed.

5. The brake source select system of claim 1, further comprising a plurality of checkvalves, each disposed in one of the source line and the supply line connected to each valve, the checkvalves being oriented to allow fluid flow from the source associated with the valve, but to block fluid flow toward said source, so that the sources are isolated from each other by the checkvalves.

6. The brake source select system of claim 1, wherein a return line is associated with each valve, providing a fluid communication path for fluid to return to the source associated with the valve.

7. The brake source select system of claim 6, wherein at least one of the valves includes a return inlet port and a return outlet port that are connected in fluid communication whenever the inlet port and the outlet port of said one valve are in fluid communication.

8. The brake source select system of claim 1, wherein the brake system is installed on an aircraft having a landing gear on which is disposed at least one wheel slowed by the brake system, further comprising a gear-up line supplied with pressurized fluid when the landing gear are retracted, said gear-up line being connected to a select port on one of the valves causing the inlet port of said one valve to be connected in fluid communication with the outlet port, so that the source with which said one valve is associated provides pressurized fluid to the brake system, enabling rotation of the wheel to be stopped prior to complete retraction of the landing gear.

9. The brake source select system of claim 1, wherein the brake system includes a normal metering valve and a reserve metering valve, the normal metering valve being connected in fluid communication with the outlet port of at least one of the valves and the reserve metering system being connected in fluid communication with the outlet port of at least one of the other valves.

10. For use in a brake system having redundant sources of pressurized fluid, a brake source select system for automatically connecting one of the sources in fluid communication with the brake system according to a predefined sequence upon failure of all sources prior in the sequence, said brake source select system comprising:
    (a) selector valve means for connecting a pressure line from a selected source and a return line to said selected source in fluid communication with the brake system, and for blocking fluid communication between pressure lines from all nonselected sources and the brake system and between return lines to said nonselected sources and the brake system, in response to a differential fluid pressure and a biasing force applied to the selector valve means;

(b) biasing means associated with the selector valve means, for providing the biasing force, said biasing force being operative to bias the selector valve means to block fluid communication between the sources of fluid pressure and the brake system;

(c) deselect means for providing a fluid pressure to the selector valve means from a first operative source of fluid pressure in the preferred sequence, said deselect pressure in combination with said bias force causing the selector valve means to block fluid communication between all other sources of fluid pressure of lower priority in the sequence and the brake system; and (d) select means for providing a fluid pressure to the selector valve means to counter the force provided by the biasing means, said fluid pressure causing said selector valve means to enable fluid communication between the first operative source of fluid pressure in the preferred sequence and the brake system, so that upon failure of one source of pressure, the next source of pressure in the preferred sequence is connected to the brake system.

11. The brake source select system of claim 10, wherein the valve selector means comprise a plurality of valve means, each associated with a separate one of the sources of fluid pressure, for controlling fluid communication of the pressure line and the return line of that source with the brake system.

12. The brake source select system of claim 11, wherein the deselect means comprise a plurality of fluid lines, each providing fluid communication between one of the sources of fluid pressure and the valve means associated with subsequent sources in the preferred sequence.

13. The brake source select system of claim 11, wherein the biasing means are disposed within the selector valve means and comprise a helical spring.

14. The brake source select system of claim 11, wherein the select means comprise a plurality of fluid lines, each connecting one source of fluid pressure in fluid communication with the valve means associated with said one source of fluid pressure.

15. The brake source select system of claim 10, further comprising means for isolating each source of fluid pressure from the other sources.

16. The brake source select system of claim 10, further comprising means for storing pressurized fluid and a compressed gas, and means for selectively providing fluid communication between the means for storing and the brake system, so that upon failure of all redundant sources, the pressurized fluid is supplied to the brake system from said means for storing.

17. The brake source select system of claim 10, wherein the brake system is installed on an aircraft having a retractable landing gear, further comprising means for causing the valve selector means to provide fluid communication between one source of pressurized fluid and the brake system in response to a signal produced upon initiation of landing gear retraction.

18. For use with a braking system of an aircraft having at least a first and a second source of pressurized hydraulic fluid for use in actuating the aircraft's brakes, a brake source selection system operative to select the first source, and if it has failed, to select the second source, said brake source selection system comprising:

(a) a first selector valve associated with the first pressure source, including a pressure inlet port, a pressure outlet port and a return outlet port, at least one deselect control port, at least one select control port, and a movable insert that in one position provides fluid communication between the pressure inlet and outlet ports, and in another position, provides fluid communication between the pressure outlet port and the return outlet port while blocking fluid flow through the pressure inlet port, the position of the movable insert depending upon application of a fluid pressure to one of the select and deselect control ports;

(b) a second selector valve associated with the second pressure source, including a pressure inlet port, a pressure outlet port, a return inlet port, a return outlet port, at least one deselect control port, at least one select control port, and a movable insert that in one position provides fluid communication respectively between the pressure inlet and outlet ports, and the return inlet and outlet ports, and in another position blocks such fluid communication, the position of the movable insert depending upon application of a fluid pressure to the select and deselect control ports;

(c) a first and a second pressure line respectively connecting the pressure inlet port of the first selector valve in fluid communication with the first source and the pressure inlet port of the second selector valve in fluid communication with the second source;

(d) a first and a second supply line respectively connecting the pressure outlet port of the first and second selector valves in fluid communication with the braking system;

(e) a first and a second select line respectively connecting the first pressure line in fluid communication with the select control port of the first selector valve and the second pressure line in fluid communication with the select control port of the second selector valve;

(f) a deselect line respectively connecting the first pressure line in fluid communication with the deselect control port of the second selector valve and the second supply line in fluid communication with the deselect control port of the first selector valve; and (g) spring means for biasing the movable insert of the second selector valve toward the position blocking fluid communication between its pressure inlet port and outlet port and between its return inlet port and outlet port in combination with fluid pressure applied to the deselect control port of the second selector valve from the first pressure line, said first source being normally connected in fluid communication with the brake system; failure of the first source interrupting application of fluid pressure to the deselect control port of the second selector valve, permitting the fluid pressure from the second source applied to the select control port of the second selector valve to overcome the spring means, forcing the movable insert within the second selector valve to the position enabling fluid communication between the second source and the brake system and applying fluid pressure to the deselect control port of the first selector valve, thus forcing the movable insert within the first selector valve to the position blocking fluid communication between the first pressure line and the brake system.

19. The brake source select system of claim 18, further comprising:
   (a) a third source of pressurized hydraulic fluid that is selected to actuate the brake system if both the first and the second sources fail;
   (b) a third selector valve associated with the third pressure source, including a pressure inlet port, a pressure outlet port, a return inlet port, a return outlet port, at least one deselect control port, at least one select control port, and a movable insert that in one position provides fluid communication respectively between the pressure inlet and outlet ports, and the return inlet and outlet ports, and in another position blocks such fluid communication, the position of the movable insert depending upon application of a fluid pressure to the select and deselect control ports;
   (c) a third pressure line connecting the pressure inlet port of the third selector valve in fluid communication with the third source;
   (d) a third supply line connecting the pressure outlet port of the third selector valve in fluid communication with the braking system and in fluid communication with the deselect control port of the first selector valve;
   (e) a third select line connecting the third pressure line in fluid communication with the select control port of the third selector valve;
   (f) a third and a fourth deselect lines respectively connecting the first pressure line in fluid communication with one of the deselect control ports of the third selector valve, and the second supply line in fluid communication with another of the deselect control ports of the third valve; and
   (g) spring means for biasing the third selector valve toward the position blocking fluid communication between its pressure inlet port and outlet port and between its return inlet port and outlet port in combination with fluid pressure applied to the deselect control ports of the third selector valve from at least one of the first pressure line and the second supply lines; failure of both the first and second pressure sources;
      (i) eliminating said fluid pressure so that the fluid pressure applied to the select control port of the third valve overcomes the bias means;
      (ii) moving the insert therein to the position permitting fluid communication respectively between the pressure inlet and outlet ports and the return inlet and the return outlet ports of the third valve; and
      (iii) applying pressurized fluid from the third source to the brake system, said pressurized fluid in the third supply line also being applied to the deselect control ports of the first and the second selector valves, causing the movable inserts therein to block fluid flow between the first and third sources and the brake system.

20. The brake source select system of claim 18, further comprising at least one checkvalve disposed in the first return line between the brake system and the return outlet port of the first selector valve, oriented to permit fluid flow from the brake system toward the first source, but to block fluid flow in the opposite direction.

21. The brake source select system of claim 18, further comprising an accumulator vessel in fluid communication with one of the first and second sources of pressurized fluid and the pressure inlet port of the selector valve associated with said one source, said accumulator vessel including a volume of a captive gas, compressed by the pressurized hydraulic fluid, which serves to provide a limited duration source of pressure should all other sources of pressurized fluid fail.

22. The brake source select system of claim 21, wherein the accumulator vessel is connected in fluid communication with the first source of pressurized hydraulic fluid by way of the first pressure line, further comprising a first checkvalve disposed in the first pressure line, upstream of a point at which the accumulator vessel is connected thereto, the first checkvalve being oriented to permit fluid flow from the first source, but to block flow in the opposite direction.

23. The brake source select system of claim 22, further comprising a bypass line having one end connected to the first pressure line upstream of the first checkvalve, and its other end connected to the first supply line, bypassing the first selector valve.

24. The brake source select system of claim 23, further comprising a second checkvalve disposed in the bypass line and oriented to permit fluid to flow therethrough from the first source toward the brake system, but to block fluid flow in the opposite direction.

25. The brake source select system of claim 19, further comprising a first checkvalve disposed in the second supply line, upstream of a point where the second supply line is connected to the deselect control port of the first selector valve, said first checkvalve being oriented to permit fluid to flow from the second pressure outlet port toward the brake system, but to block fluid flow in the opposite direction.

26. The brake source select system of claim 19, further comprising a second checkvalve disposed in the third supply line, between the third pressure outlet port and a point where the third supply line is connected the second supply line, downstream of the first checkvalve, said second checkvalve being oriented to permit fluid to flow from the third pressure outlet port toward the brake system, but to block fluid flow in the opposite direction.

27. The brake source select system of claim 18, wherein the brake system includes a normal metering valve and a reserve metering valve, and wherein the first supply line is connected in fluid communication with one of the normal and reserve metering valves and the second supply line is connected in fluid communication with the other of the normal and reserve metering valves.

28. The brake source select system of claim 18, further comprising a landing gear-up pressure line provided with pressurized fluid from an independent pressure source, the gear-up pressure line being connected to one of the deselect control ports of the second selector valve, the pressure of fluid in the gear-up pressure line causing the insert within the second selector valve to move to the position providing fluid communication between the second pressure source and the brake system.

29. The brake source select system of claim 18, further comprising a pressure actuated switch disposed on the second supply line and actuated by pressure in said line, said switch being operative to energize a warning device upon failure of the first pressure source.

30. The brake source select system of claim 18, wherein the brake system includes an anti-skid device.

* * * * *